United States Patent [19]

Piel

[11] Patent Number: 5,255,458

[45] Date of Patent: Oct. 26, 1993

[54] THREE-DIMENSIONAL PICTURE CORNERS

[76] Inventor: Alan R. Piel, P.O. Box 38, Watersmeet, Mich. 49969

[21] Appl. No.: 795,503

[22] Filed: Nov. 21, 1991

[51] Int. Cl.⁵ .............................................. B44C 5/02
[52] U.S. Cl. ................................ 40/159.1; 403/402; 24/67 CF; 24/487
[58] Field of Search ................ 40/156, 159.1, 666; 248/488, 497; 403/326, 361, 401, 402; 24/67 CF, 487, 528, 543

[56] References Cited

U.S. PATENT DOCUMENTS

| | | | |
|---|---|---|---|
| 768,313 | 8/1904 | Scherf | 24/67 CF |
| 1,407,177 | 2/1922 | Stone | 40/159.1 |
| 4,179,089 | 12/1979 | Parr, Jr. | 40/159.1 X |
| 4,807,334 | 2/1989 | Blanchard | 24/487 |

*Primary Examiner*—Kenneth J. Dorner
*Assistant Examiner*—Brian K. Green
*Attorney, Agent, or Firm*—S. Michael Bender

[57] ABSTRACT

Injection molded corners for framing pictures are designed to be attached to each corner of a picture and operate as both a hanger for a picture, as well as a means of providing a three-dimensional effect by holding the picture away from a supporting wall. The corners can be decorative so as to function totally as a frame, and a small injection molded pin is abuttable against the cardboard backing of a picture to effectively lock the corners in position.

2 Claims, 4 Drawing Sheets

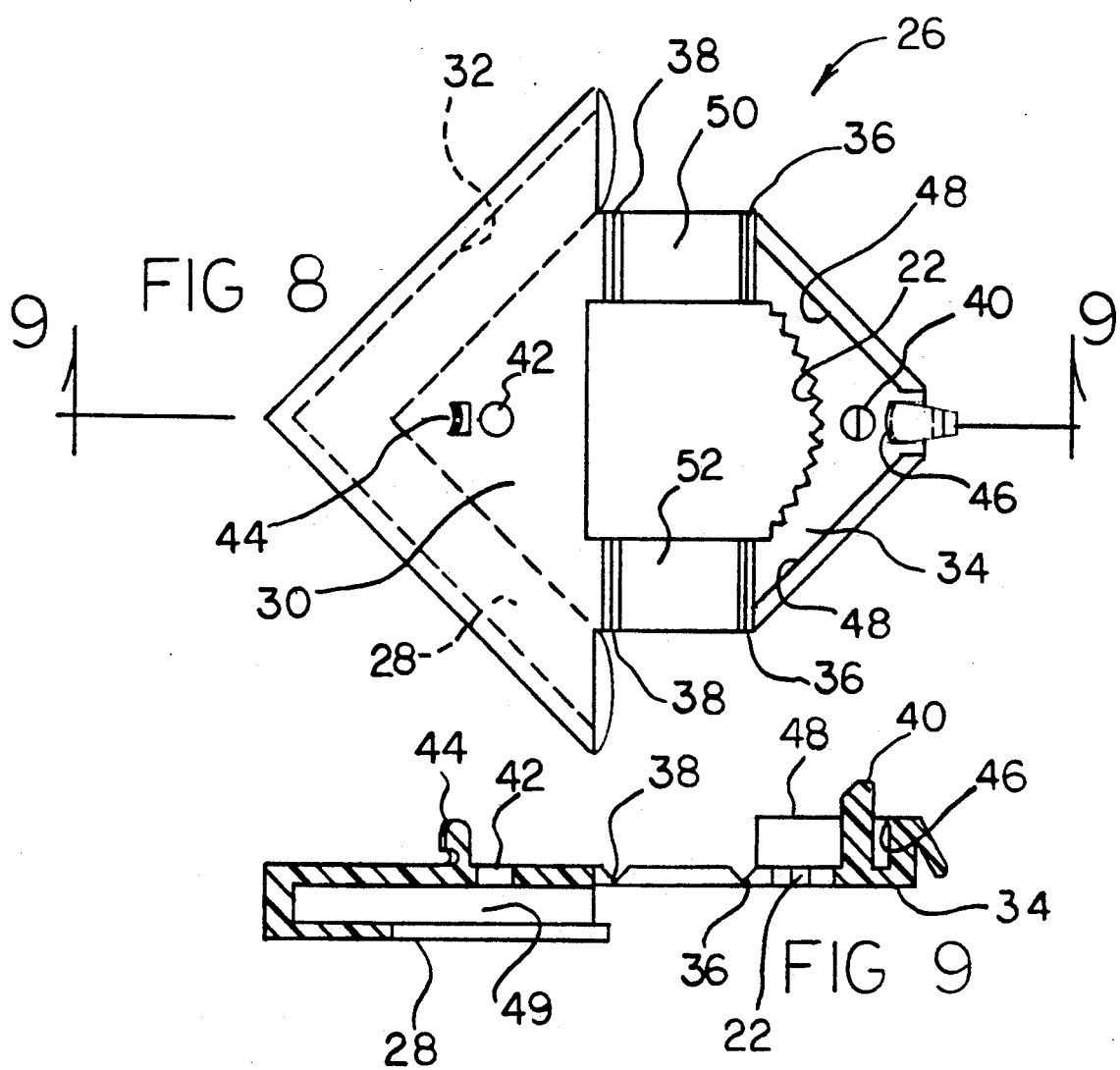
FIG 8
FIG 9
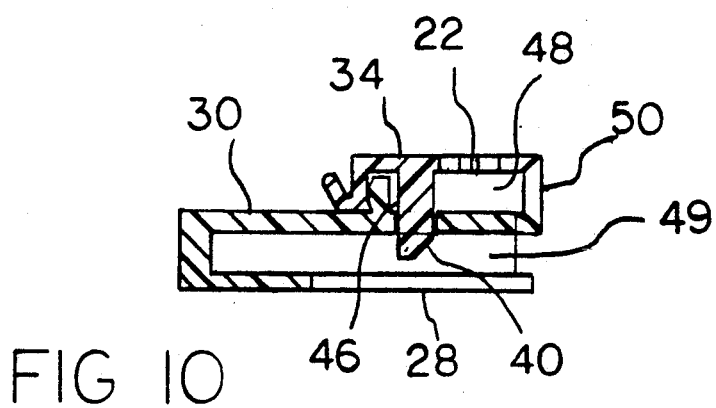
FIG 10

THREE-DIMENSIONAL PICTURE CORNERS

BACKGROUND OF THE INVENTION

1. Field of the Invention

The present invention relates to corner supports for pictures or picture frames, and more particularly pertains to decorative corners attachable to such pictures or picture frames which operate both as hangers and as a means of providing a three-dimensional effect by holding a picture away from a supporting wall surface.

2. Description of the Prior Art

The picture frame art is a crowded art, and many different types of corner mount supports for pictures are known and are commercially available. A typical example of a corner mount type picture frame is shown in U.S. Pat. No. 4,479,318 which issued to D. Russell on Oct. 30, 1984. The Russell patent discloses a paper board picture frame support which essentially comprises a solid sheet of paper board having a series of corner straps depending from it. The corner straps are attached to the paper board picture frame through the use of an adhesive, and no special means are provided for directly attaching a picture to the corner straps. The construction of this paper board picture frame is typical of the types of frames now available in the prior art, and no commercially available models are designed to be attached directly to a picture without either the use of an adhesive or a backing interconnecting all of the corner tabs. As such, there appears to be a continuing need for new and improved methods and apparatuses for attaching corner tabs to pictures and the like, and in this respect, the present invention substantially fulfills this need.

SUMMARY OF THE INVENTION

In view of the foregoing disadvantages inherent in the known types of corner mount picture frames now present in the prior art, the present invention provides an improved corner mount picture frame construction wherein each of the corner mounts may be individually attached to an existing picture or picture frame without the necessity of there being any interconnection therebetween. As such, the general purpose of the present invention, which will be described subsequently in greater detail, is to provide a new and improved corner mount picture frame construction which has all the advantages of the prior art corner mount picture frames and none of the disadvantages.

To attain this, the present invention essentially comprises injection molded corners for framing pictures which are designed to be attached to each corner of a picture and operate as both a hanger for a picture, as well as a means of providing a three-dimensional effect by holding the picture away from a supporting wall. The corners can be decorative so as to function totally as a frame, and a small injection molded pin is abuttable against the cardboard backing of a picture to effectively lock the corners in position.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved corner mount picture frame which has all the advantages of the prior art corner mount picture frames and none of the disadvantages.

It is another object of the present invention to provide a new and improved corner mount picture frame which may be easily and efficiently manufactured and marketed.

It is a further object of the present invention to provide a new and improved corner mount picture frame which is of a durable and reliable construction.

An even further object of the present invention is to provide a new and improved corner mount picture frame which is susceptible of a low cost of manufacture with regard to both materials and labor, and which accordingly is then susceptible of low prices of sale to the consuming public, thereby making such corner mount picture frames economically available to the buying public.

Still yet another object of the present invention is to provide a new and improved corner mount picture frame which provides in the apparatuses and methods of the prior art some of the advantages thereof, while simultaneously overcoming some of the disadvantages normally associated therewith.

Still another object of the present invention is to provide a new and improved corner mount picture frame wherein each corner mount can be individually attached to an existing picture or picture frame and further, wherein each corner mount can function as a hanger if desired.

Yet another object of the present invention is to provide a new and improved corner mount picture frame which operably provides a three-dimensional effect by holding a picture away from a supporting wall surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Another object is to provide a means of levelling the frame in any direction (i.e. with any of the four sides facing up.)

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is a front elevation view of a second embodiment of the invention.

FIG. 9 is a cross-sectional view of the second embodiment as viewed along the line 9—9 in FIG. 8.

FIG. 10 is an end elevation view of the second embodiment showing the same in a closed position.

DESCRIPTION OF THE PREFERRED EMBODIMENTS

Figure 1:
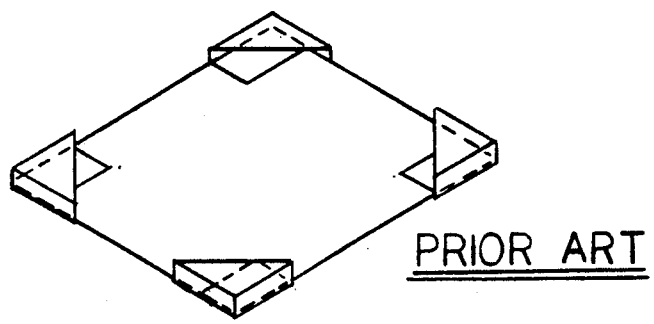
FIG. 1 a perspective view of a prior art corner mount picture frame.
Figure 2:
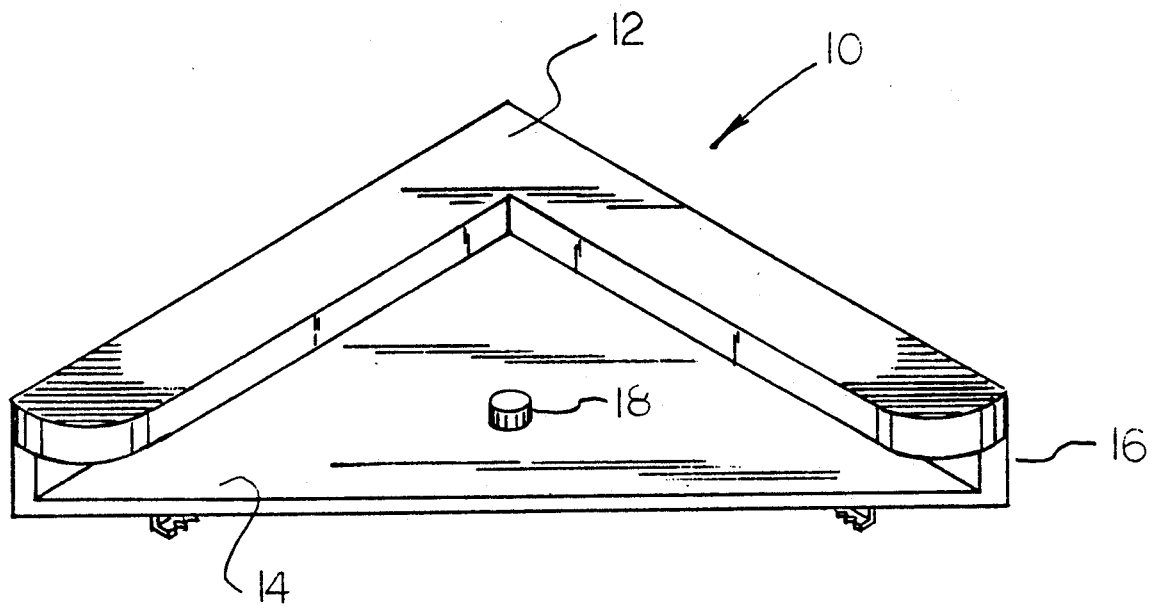
FIG. 2 is a perspective view of the first embodiment of the present invention.
Figure 3:
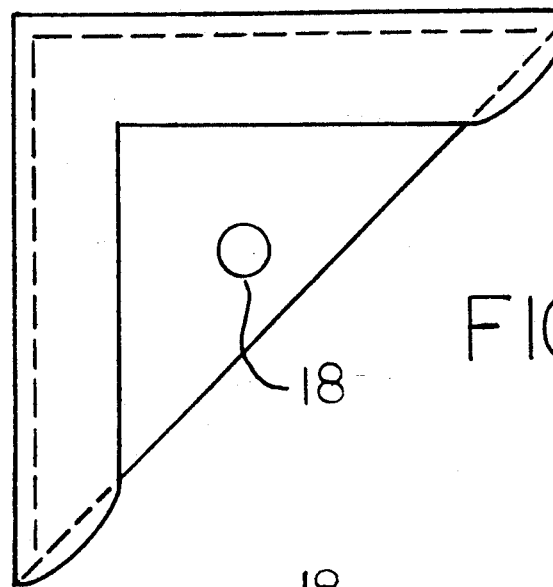
FIG. 3 is a front elevation view of the invention.
Figure 4:
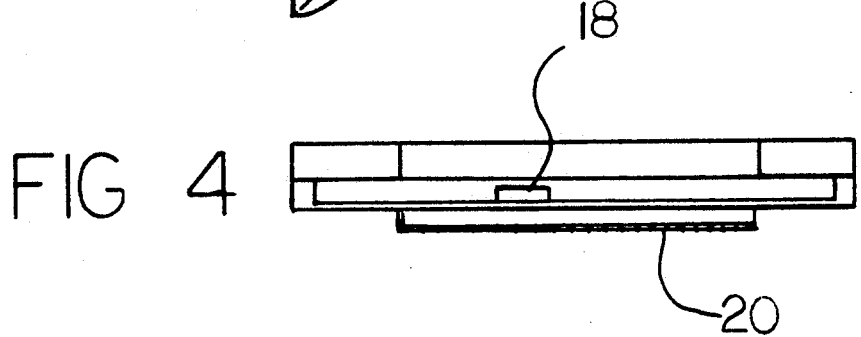
FIG. 4 is an end elevation view thereof.
Figure 5:
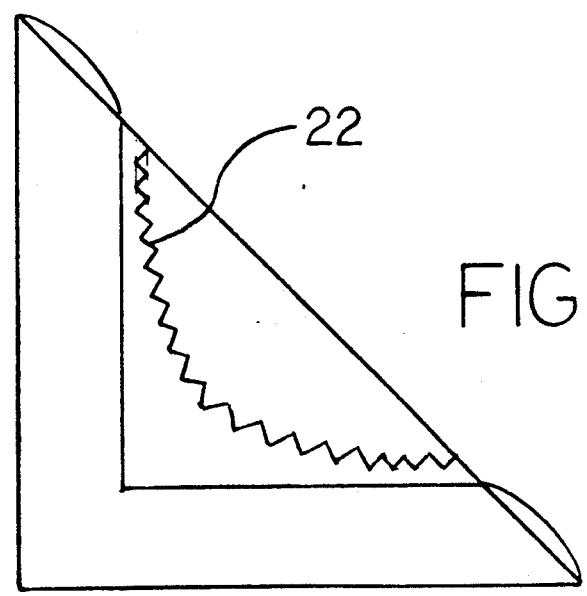
FIG. 5 is a rear elevation view thereof.

With reference now to the drawings, a new and improved corner mount picture frame assembly embodying the principles and concepts of the present invention and generally designated by the reference numeral 10 will be described.

Initially however, reference is made to FIG. 1 of the drawings wherein a typical prior art paper board picture frame having attached corner mounts is illustrated. In this regard, the prior art frame assembly shown in FIG. 1 represents the type of corner mount assembly priorly discussed with reference to U.S. Pat. No. 4,479,318. This type of assembly is illustrative of the fact that corner mounts are generally attached to a supporting structure such as a cardboard backing or the like, and this is exactly the type of arrangement which the present invention deviates from.

FIGS. 2-5 illustrate the basic construction of a first embodiment of the invention. As shown, the corner mount assembly 10 includes a visible corner structure 12 defined by an L-shaped member integrally or otherwise attached to a triangularly shaped backing member 14 having a side wall 16 so as to define a space between the corner frame 12 and the backing member. Integrally molded to and extending upwardly from the backing member 14 is a protrusion or pin 18 which is designed to engage the back of a picture having its corner inserted into the corner mount 10. In effect, the protrusion 18 serves to warp the picture corner into a frictional engagement within the space defined between the frame structure 12 and the backing member 14. Spaced rearwardly from the triangular member 14 is an L-shaped member 20 provided with interior saw tooth-like edges 22 designed to engage a conventional hanger support, such as a nail or the like.

Figure 6:
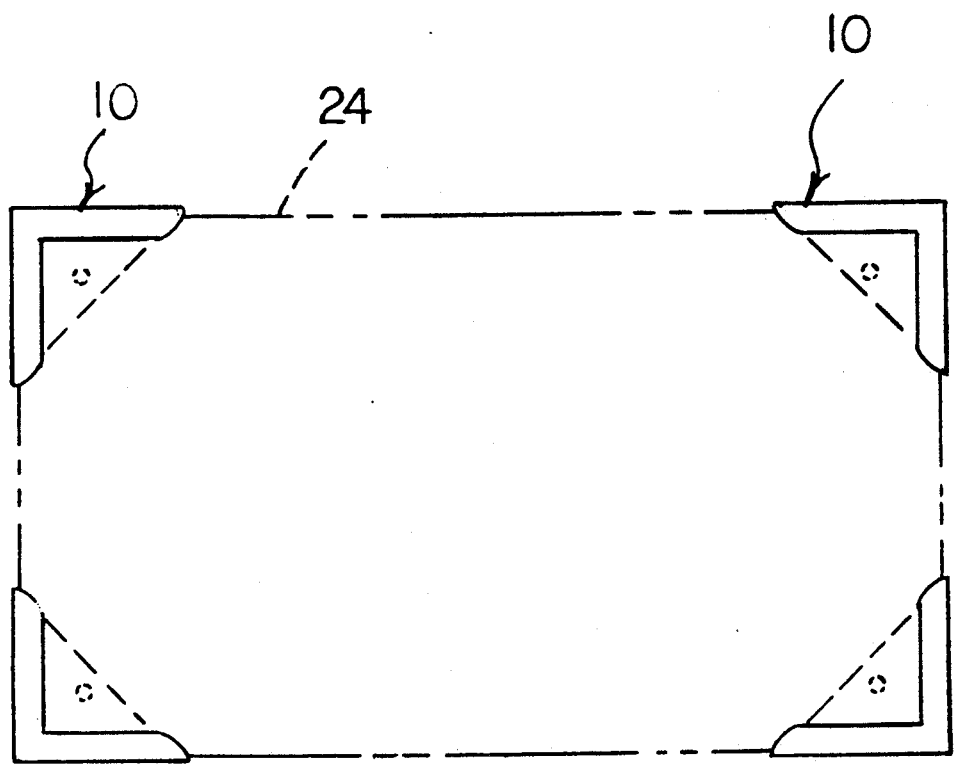
FIG. 6 is an elevation view illustrating the manner of usage of the first embodiment of the invention.
Figure 7:
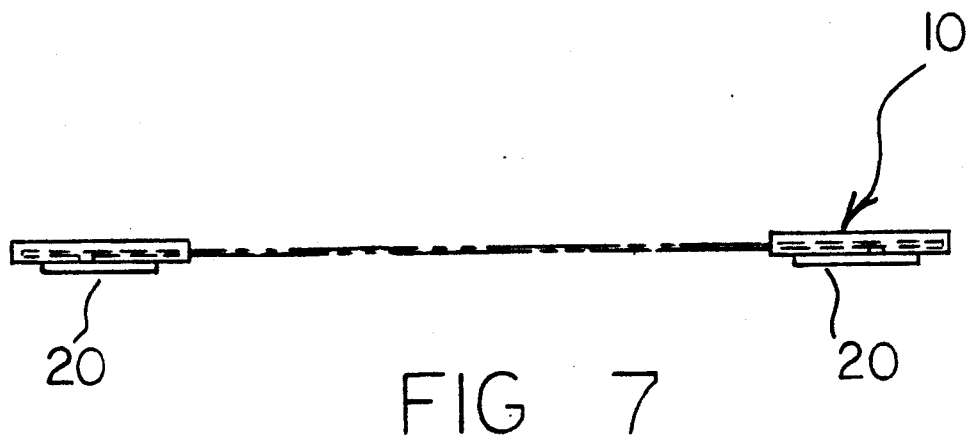
FIG. 7 is an end elevation view of the arrangement shown in FIG. 6.

In use, an individual corner mount assembly 10 can be positioned over each corner of a picture 24 as illustrated in FIGS. 6 and 7, and if a cardboard backing is utilized with a picture, the protrusions 18 will frictionally warp the picture corners so as to effect a retention of each corner mount assembly 10 to the picture. Any two of the corner mount assemblies 10 can be utilized to secure a picture 24 to a wall through the simple positioning of a pair of nails or the like, inasmuch as the sawtooth edges 22 of the support member 20 can be used to align and hang the picture. The fact that each L-shaped member 20 extends outwardly from the back of a corner mount 10 results in a picture being spaced apart from a wall surface to which it is mounted, thereby to provide a three-dimensional effect. The spacing achieved by the members 20 is illustrated in FIG. 7 and, as can be appreciated, a greater depth L-shaped member can be utilized if an enhanced three-dimensional effect is desired.

FIGS. 8-10 illustrate a modified embodiment of the invention which is generally designated by the reference numeral 26. Again, a single integral piece molded construction is envisioned and an L-shaped decorative corner frame member 28 is integrally attached to a triangularly shaped backing member 30 by integral side walls 32. A V-shaped connector 34 is integrally attached to the backing member 30 by a first set of aligned hinges 36 and a second set of such aligned hinges 38. The hinges 36, 38 effectively constitute thin areas of plastic formed during the molding process whereby bend lines are created to define the hinges. A protrusion 40 extends upwardly from the member 34, and an aperture 42 is formed in a through-extending manner within the backing member 30 for receiving the protrusion in a manner to be subsequently described.

A further upstanding hook member 44 is integrally formed in the backing member 30 and an engagement clip 46 is designed to engage the hook 44 as will be subsequently explained. Lastly, an integral side wall 48 is molded onto the member 34 to add rigidity to the structure. In use, this second embodiment 26 of the invention is positionable over the corner of a picture whereby the picture corner is inserted into the space 49 created by the corner frame structure 28 and the backing member 30. The member 34 is then bent over so as to close the hinges 36, 38 in a manner illustrated in FIG. 10, whereby the protrusion 40 effectively engages the picture corner so as to prevent its removal from the structure 26. At the same time, the molded hook member 46 engages the upstanding protrusion 44 so as to lock the V-shaped member 34 into engagement with the backing member 30 as clearly evident in FIG. 10. The integral wall members 50, 52 are defined in length by the spacing 36, 38 from each other, and these members 50, 52 then serve as a measure of how far the corner mount assembly 26 will be spaced away from a supporting wall structure, thereby to achieve a desired three-dimensional effect. As shown in FIGS. 8-10, triangular member 34 is provided with a saw-tooth edge 22 to engage a hanger support such as a nail in the same manner as disclosed in connection with the prior embodiment of FIGS. 2-5.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification ar intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United Sates is as follows:

1. A three-dimensional corner mount for a planar element to be mounted on a wall comprising:

a corner mount having a triangular shaped backing member, a frame member and a wall connecting said triangular shaped backing member and said frame member in a spaced apart manner to define a space between said backing member and said frame member sufficient to receive therein a corner of said planar member to be mounted on a wall, said triangular shaped backing member having an integral hinged portion extending from one edge thereof, said hinged portion having a connector portion attached thereof said hinged portion having a hinge axis parallel to said one edge wherein said connector portion is adapted to be bent back and positioned over the side of said backing member opposite to said frame member, said backing member having an aperture therein, said connector member having a protrusion thereon adapted to extend through said aperture when said connector portion is bent back and positioned over said one side of said backing member, said backing member one side having an upstanding member and said connector portion having an engagement member adapted to cooperate with said upstanding member to maintain said connector portion bent back over said one side of said backing member with said protrusion extending through said aperture for engaging a planar member received in said corner mount and for frictionally engaging said planar member between said frame member and said backing member.

2. The three dimensional corner mount of claim 1 wherein said connector portion further comprises an opening therein, and a portion of an edge defining said opening has a saw tooth shape thereby to define a surface for engaging a wall hanging support element.

* * * * *